June 14, 1960  D. A. LOREN ET AL  2,940,392

DIFFERENTIAL BAROMETRIC FUZE

Filed Jan. 31, 1958

INVENTORS
DONALD A. LOREN
ALVIN VAN EVERY

BY

ATTORNEYS 2,940,392
Patented June 14, 1960

2,940,392
DIFFERENTIAL BAROMETRIC FUZE

Donald A. Loren, 4023 Anderson Ave. SE., Albuquerque, N. Mex., and Alvin Van Every, Parkland, Md. (26 Kentucky Ave., Washington 28, D.C.)

Filed Jan. 31, 1958, Ser. No. 712,593

6 Claims. (Cl. 102—70.2)

(Granted under Title 35, U.S. Code (1952), sec. 266)

The invention described herein may be manufactured and used by or for the United States Government for governmental purposes without payment to us of any royalty thereon.

This invention relates to apparatus for use as a differential barometric fuze for explosives.

An important object of this invention is to provide an accurate barometric fuze for the detonation of airborne explosives.

A further object of this invention is to provide an accurate barometric fuze that is reliable, uncomplicated, and unsusceptible to counter-measures.

A further object of this invention is to provide an apparatus for optionally and selectively effecting a barometric differential pressure responsive device while said device is being transported by air.

The above objects, as well as other objects, will be more clearly apparent in view of the following description and claims when taken in conjunction with the accompanying drawings wherein:

Figure 1:
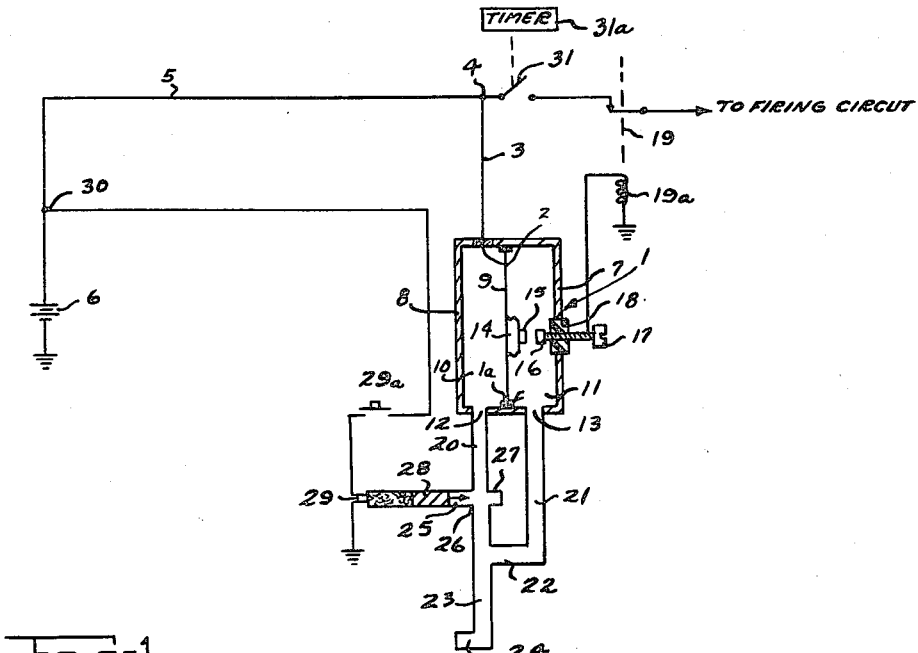
Figure 1 is a schematic diagram of the invention.

Referring now to Figure 1, the reference numeral 1 indicates generally a closed casing for the differential barometric fuze. The reference numeral 2 indicates the point of connection to the diaphragm item 9, which is electrically insulated from the casing 1 by packing 1a, of an electrical circuit wire 3 which is connected at 4 to an electrical circuit generally indicated by the reference numeral 5, which in turn has a source of electrical power 6.

The casing 1 comprises spaced side walls 7 and 8 between which is an atmospheric pressure responsive diaphragm 9 having a first side and a second side separating casing 1 into a pair of chambers 10 and 11. The chamber 11 and the second side of the diaphragm are always open to atmosphere and chamber 10 and the first side are normally open to atmosphere at outlets 12 and 13 through the conduits 20 and 21 which merge at 22 into a common conduit 23 for exposure to free air pressure at 24.

Conduit 25 perpendicularly joins conduit 23 between merger point 22 and outlet 12 at reference point 26. A recess 27, of the same diameter as the conduit 25, is located in the wall of conduit 20 which is diametrically opposite the juncture point 26. A resilient plug 28 is connected to an explosive switch 29, located in conduit 25 behind the plug 28. Explosive switch 29 is directly connected to "pickle button" 29a, circuit 5, and to power supply 6 at 30, which latter point of connection is between point 4 and power supply 6.

Diaphragm 9 is electrically connected to circuit 5 at reference numeral 2. In chamber 11 which is always open to atmosphere against the second side of the diaphragm a hermetically sealed bellows 14 containing the standard sea level atmospheric pressure (approximately 29.92 inches of mercury) is centrally mounted upon diaphragm 9. Electrical contact point 15 is centrally and axially mounted upon the outside face of bellows 14 which face is located diametrically opposite to the face of diaphragm 9.

Adjustment screw 17, for varying the altitude differential, is insulated from casing 1 by insulation packing 18 and is centrally mounted in side wall 7. One end of screw 17 protrudes into chamber 11 and has contact point 16 adapted to register with contact point 15 of the diaphragm 9. Although the present embodiment contemplates using a screw driver adjustment for setting the desired altitude differential into the device, it is realized that the differential could be remotely set by incorporating a servo system which may be adjusted to the desired altitude any time prior to depressing the pickle button 29a. Such an arrangement is clearly contemplated as being within the scope of this invention.

Adjustment screw 17 is electrically connected to a normally closed relay switch 19 comprising a solenoid 19a for opening and closing firing circuit 5, which is connected to the desired explosive (not shown).

A normally open "safe" separation timer switch 31 is located in firing circuit 5 between connection 4 and the relay switch 19. A conventional timer 31a connected to the timer switch is started when the explosive is released from the aircraft A, Figure 2, and is set so that it subsequently closes switch 31, while the explosive is descending, at some point 38 above the fuzing altitude 39.

Figure 2:
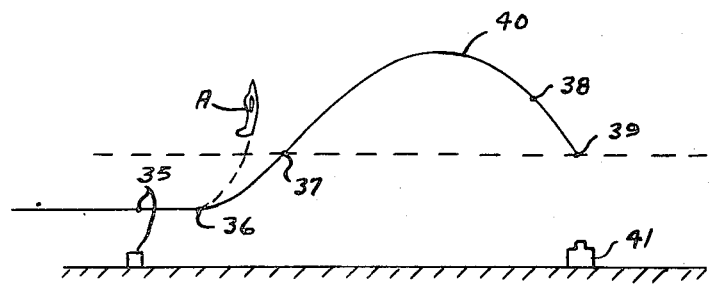
Figure 2 is a somewhat schematic diagram showing a preferred application of the delivery and operation of the invention.

In operation, as shown in Figure 2, the aircraft carrying the explosive and the barometric differential fuze device, passes over an identification point 35 while making a low altitude approach toward the target 41. At this point, the pickle button 29a, Figure 1 is depressed, firing explosive switch 29 which causes plug 28 to be projected into 27 and sealing off conduit 20 and chamber 10 with resilient plug 28, thus effecting a reference pressure in the chamber 10. The explosive is then released or tossed upwardly at point 36, making a trajectory toward target 41 as generally indicated at 40. The timer 31a for safe separation timer switch 31 is started by this release. As the explosive ascends the pressure in reference pressure chamber 10 pushes against diaphragm 9, thus forcing contact 15 against contact 16 at 37 and supplying power to solenoid 19a (Figures 1 and 2). This causes normally closed relay 19 to open and blocks the power path to the firing circuit 5. The contacts 15 and 16 remain closed during the remainder of the ascent of the explosive and open at reference point 39 during the descent of the explosive. The safe separation timer closes at approximately point 38. Therefore, when the contacts 15 and 16 open, relay switch 19 closes, thus completing the firing circuit from the source of power 6 to the explosive.

The fuze also includes a hermetrically sealed standard sea level pressure bellows 14, mounted upon diaphragm 9, which acts as a compensating device to permit attacks on targets of varying elevations without additional adjustments. Without such compensation, a given pressure differential will result in a different altitude differential for each target elevation.

The above specification and drawing describe a specific embodiment of the invention for purposes of explanation, it being apparent that various minor changes may be made therein without departing from the spirit and scope of the invention as defined by the following claims, whereby we claim:

1. In a barometric fuze device, in combination, a closed casing having spaced side walls, a diaphragm dividing said casing into a pair of pressure chambers and movable responsive to a pressure differential between said chambers, both of said chambers being normally open to the atmosphere to balance the pressure in said chambers, normally spaced electrical contact means between said diaphragm and side wall of one of said chambers adapted to close a circuit upon movement of said diaphragm by differential pressure between said chambers, means for instantaneously closing one of said chambers to the atmosphere to effect an instantaneous atmospheric reference pressure in the last mentioned chamber relative to the atmospheric pressure in the other chamber, whereby a subsequent decrease in pressure in the chamber open to atmospheric pressure moves said contacts toward circuit closing relation.

2. Apparatus as claimed in claim 1 in which one of said contacts is carried by said diaphragm and the other contact is carried by the side wall of said casing opposite the diaphragm.

3. Apparatus as claimed in claim 1 including differential atmospheric pressure compensating means carried between the diaphragm and one of said contacts comprising a closed bellows chamber having a predetermined reference pressure therein to vary the normal separation between said contacts in predetermined relation to changes in barometric pressure.

4. Apparatus as claimed in claim 3 in which the means for instantaneously closing said reference pressure chamber to the atmosphere comprises a plug member, and explosive means for actuating said plug member to seal said reference pressure chamber to prevent pressure leakage from said chamber.

5. In a barometric fuze device, for an explosive, in combination, a closed casing having spaced side walls, a diaphragm between said side walls dividing said casing into two spaced adjacent pressure chambers, dual conduit means connected to said chambers for freely admitting atmosphere into both of said chambers to normally equalize the atmospheric pressure in said chambers, shiftable closure means in one of said conduit means for instantaneously closing the latter conduit means to trap the atmospheric pressure in the one of said last mentioned chambers to subsequently act as a differential reference pressure in said chamber to variations in atmospheric pressure in the other chamber, means for actuating said shiftable closure means to close the reference pressure chamber, a barometric pressure bellows device carried by said diaphragm for movement therewith in the chamber which is open to atmosphere at all times, a first electrical contact carried by said bellows device facing the adjacent side wall of said casing in spaced relation thereto, a second electrical contact carried by said adjacent side wall for contacting relation with said first contact upon predetermined movement of said diaphragm toward said adjacent side wall, a normally closed relay, an arming circuit connected between said relay and said contacts, a normally open firing circuit connected between said relay and said explosive for the detonation thereof, a timer switch device connected in said firing circuit for closing said firing circuit prior to closing of said firing circuit by said relay means.

6. In a high explosive detonating device, an open firing circuit therefor, a timer in said firing circuit for closing said firing circuit after a predetermined time interval, switch means in said firing circuit in series with said timer for closing said firing circuit through said timer, relay means normally closng said switch means, a differential pressure actuated switch device including a diaphragm having a second side always open to atmosphere at all times and a first side normally open to atmosphere, normally spaced circuit closing contacts connected to said relay means, plural conduit means for initially maintaining a balance of pressure in said differential pressure actuated switch device on both sides of said diaphragm to maintain said last mentioned switch contacts in spaced relation, means closing one of said conduit means at anytime for establishing a reference pressure relative to atmospheric pressure in said differential pressure actuated switch device, whereby a predetermined decrease in atmospheric pressure on said second side of said diaphragm closes said spaced contacts to actuate said relay means to open said firing circuit and subsequent corresponding increase in pressure on said second side, in atmospheric pressure, after said firing circuit is closed by said timer opens said spaced contacts to deenergize said relay to complete said firing circuit through said timer to detonate said high explosive device.

References Cited in the file of this patent

UNITED STATES PATENTS

| | | |
|---|---|---|
| 2,110,552 | Hayden | Mar. 8, 1938 |
| 2,330,873 | Doe | Oct. 5, 1943 |
| 2,368,747 | Doe | Feb. 6, 1945 |
| 2,411,788 | Hammond | Nov. 26, 1946 |
| 2,466,729 | Nelson | Apr. 12, 1949 |
| 2,647,465 | Rabinow | Aug. 4, 1953 |
| 2,720,835 | Houston | Oct. 18, 1955 |